(12) United States Patent
Lee et al.

(10) Patent No.: US 9,761,900 B2
(45) Date of Patent: Sep. 12, 2017

(54) POLYMER ELECTROLYTE MEMBRANE FOR FUEL CELL AND METHOD FOR MANUFACTURING THE SAME

(75) Inventors: Dong Hoon Lee, Goyang-si (KR); Moo-Seok Lee, Seoul (KR); Na Young Kim, Yeongi-gun (KR); Yong-Cheol Shin, Seoul (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 602 days.

(21) Appl. No.: 14/131,544

(22) PCT Filed: Jul. 30, 2012

(86) PCT No.: PCT/KR2012/006059
§ 371 (c)(1),
(2), (4) Date: Jan. 8, 2014

(87) PCT Pub. No.: WO2013/019047
PCT Pub. Date: Feb. 7, 2013

(65) Prior Publication Data
US 2014/0154594 A1    Jun. 5, 2014

(30) Foreign Application Priority Data

Jul. 29, 2011  (KR) .................. 10-2011-0075531

(51) Int. Cl.
| | | |
|---|---|---|
| *H01M 8/10* | (2016.01) | |
| *H01M 10/0562* | (2010.01) | |
| *H01M 8/1065* | (2016.01) | |
| *H01M 8/1053* | (2016.01) | |
| *H01M 8/106* | (2016.01) | |
| *H01M 8/102* | (2016.01) | |
| *H01M 8/1051* | (2016.01) | |
| *H01M 8/1081* | (2016.01) | |

(52) U.S. Cl.
CPC ......... *H01M 8/1065* (2013.01); *H01M 8/102* (2013.01); *H01M 8/106* (2013.01); *H01M 8/1051* (2013.01); *H01M 8/1053* (2013.01); *H01M 8/1081* (2013.01); *C08J 2379/04* (2013.01); *H01M 2300/0091* (2013.01); *Y02P 70/56* (2015.11)

(58) Field of Classification Search
CPC ......... H01M 10/0564; H01M 10/0565; H01M 2300/0017; H01M 8/1046; H01M 8/1051; H01M 8/1055
See application file for complete search history.

(56) References Cited

U.S. PATENT DOCUMENTS

| | | | |
|---|---|---|---|
| 6,042,958 A | 3/2000 | Denton et al. | |
| 6,248,469 B1 | 6/2001 | Formato et al. | |
| 6,764,624 B2 * | 7/2004 | Saito ..................... | B29C 43/006 264/105 |
| 6,773,844 B2 * | 8/2004 | Nakano ............... | H01M 8/1004 429/309 |
| 8,211,590 B2 * | 7/2012 | Hojo ......................... | C08J 5/22 429/492 |
| 8,632,926 B2 * | 1/2014 | Lee ........................ | H01B 1/122 429/491 |
| 2002/0061432 A1 | 5/2002 | Nakano et al. | |
| 2004/0146766 A1 | 7/2004 | Li et al. | |
| 2006/0111530 A1 | 5/2006 | Li et al. | |
| 2006/0127348 A1 | 6/2006 | Lomasney et al. | |
| 2008/0233451 A1 | 9/2008 | Hong et al. | |
| 2009/0220840 A1 | 9/2009 | Yamaguchi et al. | |
| 2012/0231355 A1 | 9/2012 | Lee et al. | |

FOREIGN PATENT DOCUMENTS

| | | |
|---|---|---|
| JP | 10312815 A | 11/1998 |
| JP | 2002110200 A | 4/2002 |
| JP | 2006244920 A | 9/2006 |
| JP | 2006294323 A | 10/2006 |
| JP | 2007523066 A | 8/2007 |
| JP | 2009-224132 A | 10/2009 |
| KR | 10-2010-0036136 A | 4/2010 |
| KR | 10-2011-0021217 A | 3/2011 |
| WO | 2007029346 A1 | 3/2007 |

* cited by examiner

*Primary Examiner* — Patrick Ryan
*Assistant Examiner* — Julian Anthony
(74) *Attorney, Agent, or Firm* — Sughrue Mion, PLLC

(57) ABSTRACT

Disclosed are a polymer electrolyte membrane showing high ion conductivity even under the condition of low humidity and high temperature and a method for manufacturing the same. The polymer electrolyte membrane of the present invention comprises a porous substrate, a self proton conducting material dispersed in the porous substrate, and an ion conductor impregnated in the porous substrate. The self proton conducting material comprises an inorganic particle functionalized with an azole ring.

10 Claims, No Drawings

POLYMER ELECTROLYTE MEMBRANE FOR FUEL CELL AND METHOD FOR MANUFACTURING THE SAME

CROSS REFERENCE TO RELATED APPLICATIONS

This application is a National Stage of International Application No. PCT/KR2012/006059, filed Jul. 30, 2012, claiming priority from Korean Patent Application No. 10-2011-0075531, filed Jul. 29, 2011, the contents of all of which are incorporated herein by reference in their entirety.

TECHNICAL FIELD

The present invention relates to a polymer electrolyte membrane for fuel cell and a method for manufacturing the same, and more particularly, to a polymer electrolyte membrane showing high ion conductivity even under the condition of low humidity and high temperature and a method for manufacturing the same.

BACKGROUND ART

A fuel cell, unlike a conventional battery, is an electricity-generating battery and thus does not need to be replaced or recharged. It oxidizes a fuel such as hydrogen or methanol to generate a chemical energy and then converts the chemical energy into an electrical energy. Since a fuel cell is a electricity-generating device of high efficiency facilitating an energy conversion rate of about 60%, it can remarkably reduce the fuel consumption. Furthermore, it is one of the eco-friendly energy sources without generating pollutants. A fuel cell having such advantages can be applied to various fields, especially to a power supply for a transport such as a vehicle and so on.

A fuel cell may be classified into various types based on the kind of an electrolyte and the operation temperature. Among the various types of a fuel cell, a polymer electrolyte membrane fuel cell (PEMFC) is receiving special attention as a future power supply.

A polymer electrolyte membrane fuel cell comprises an anode, a cathode, and a polymer electrolyte membrane therebetween. Hydrogen or gas including hydrogen is generally used as a fuel to be supplied to the anode. Oxygen or gas including oxygen is generally used as an oxidant to be supplied to the cathode. The fuel is oxidized at the anode to create a proton and an electron. The proton is delivered to the cathode through the electrolyte membrane and the electron is delivered to an external circuit. The proton coming through the electrolyte membrane, an electrode from the external circuit, and oxygen are combined at the cathode to create water.

From the viewpoint of the generating efficiency of a fuel cell or the system efficiency, it is required for the electrolyte membrane to have a good cation conductivity under the conditions of high temperature of 100° C. to 300° C. and low humidity of 50% or less.

However, a sufficient amount of moisture needs to be supplied for the conventional electrolyte membrane formed of a polymer having a sulfonic acid group to perform the proton conducting function well. The conventional electrolyte membrane cannot perform the cation conducting function in a satisfactory manner under the condition where moisture is easily evaporated, i.e., high temperature of 100° C. or higher or low humidity of 50% or less.

To solve the aforementioned problem, hetero ring compounds such as imidazole, pyrazole, and benzimidazole are suggested as a cation conductor which can supersede the water. (Journal of The Electrochemical Society, 2007, 154 (4), pp. 290-294).

However, the hetero ring compounds, due to their low molecular weight, are volatile materials which cannot be tightly fixed to an electrolyte membrane, and there has not been suggested any method so far to tightly fix the volatile compounds to an electrolyte membrane.

DISCLOSURE

Technical Problem

Therefore, the present invention is directed to a polymer electrolyte membrane for a fuel cell capable of preventing these limitations and drawbacks of the related art and to a method for manufacturing the same.

An aspect of the present invention is to provide a polymer electrolyte membrane showing high ion conductivity even under the condition of low humidity and high temperature.

Another aspect of the present invention is to provide a method for manufacturing a polymer electrolyte membrane showing high ion conductivity even under the condition of low humidity and high temperature.

Additional advantages, objects, and features of the present invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof.

Technical Solution

According to one aspect of the invention, there is provided a polymer electrolyte membrane comprising: a porous substrate; a self proton conducting material dispersed in the porous substrate; and an ion conductor impregnated in the porous substrate, wherein the self proton conducting material comprises an inorganic particle functionalized with an azole ring.

According to another aspect of the invention, there is provided a method for manufacturing a polymer electrolyte membrane, the method comprising: preparing a porous substrate in which a self proton conducting material is dispersed; and impregnating an ion conductor in the porous substrate, wherein the self proton conducting material comprises an inorganic particle functionalized with an azole ring.

The general description provided above and the detailed description provided below are only for illustration of the present invention and should be construed as providing a more detailed description of the inventions defined in claims.

Advantageous Effects

The electrolyte membrane of the present invention can perform the cation conducting function in a satisfactory manner even under the condition of high temperature of 100° C. or higher and low humidity of 50% or less. Furthermore, the electrolyte membrane of the present invention has excellent mechanical strength and high durability since it has a composite structure comprising a porous substrate and an ion conductor impregnated therein.

As a result, according to the present invention, the generating efficiency of a fuel cell as well as the system efficiency can be improved.

Other effects of the present invention will be described in detail below together with the technical features associated therewith.

MODE FOR INVENTION

Hereinafter, the embodiments of present invention will be described and explained in detail only for illustrative purposes. Those skilled in the art will appreciate that various modifications, additions and substitutions are possible, without departing from the scope and spirit of the invention. Accordingly, the present invention includes all alternations and modifications that fall within the scope of inventions described in claims and equivalents thereto.

The polymer electrolyte membrane for fuel cell according to the present invention comprises a porous substrate, a self proton conducting material dispersed in the porous substrate, and an ion conductor impregnated in the porous substrate.

The porous substrate increases the mechanical strength of the electrolyte membrane as well as improves its dimensional stability by inhibiting the expansion thereof which otherwise could be caused due to the moisture.

Taking the cost and chemical resistance into consideration, the porous substrate of the present invention may be formed of a hydrocarbon polymer insoluble in an organic solvent. The term "insoluble" in an organic solvent means a material cannot not be dissolved in an organic solvent such as DMAc, NMP, DMF and so on at room temperature and atmospheric pressure.

For example, nylon, polyimide, polybenzoxazole, polyethyleneterephtalate, polyethylene, polypropylene, a copolymer thereof, or a mixture thereof can be used as a hydrocarbon polymer to form the porous substrate. Particularly, polyimide or polybenzoxazole is suitable for an electrolyte membrane for a fuel cell operated at high temperature since they have high melting point not lower than 500° C. and can provide the electrolyte membrane with excellent mechanical strength.

The content of the porous substrate in the polymer electrolyte membrane can be 1 to 15 wt %. If the content is less than 1 wt %, the mechanical strength and dimensional stability of the composite electrolyte membrane would be remarkably decreased. On the other hand, if the content is more than 15 wt. %, the ion conductivity of the composite electrolyte membrane would be remarkably decreased.

The porous substrate can be in the form of a non-woven fabric where staple fibers are connected with each other in three-dimensional. In other words, the porous substrate may comprise fibers forming a three-dimensional network. The porous substrate having such structure may have a porosity of 60 to 90%. If the porosity of the porous substrate is less than 60%, the ion conductivity of the composite electrolyte membrane cannot be raised to the required degree since the porous substrate cannot be impregnated with a sufficient amount of the ion conductor due to its low surface area. On the other hand, if the porosity of the porous substrate is more than 90%, the mechanical strength and dimensional stability of the electrolyte membrane would be remarkably decreased.

The porous substrate can be formed to have an average pore diameter of 0.05 to 20 µm. If the average pore diameter is less than 0.05 µm, the ion conductivity of the composite electrolyte membrane would be remarkably decreased. On the other hand, if the average pore diameter is more than 20 µm, the mechanical strength and dimensional stability of the composite electrolyte membrane would be remarkably decreased.

The porous substrate may comprise a staple fiber having a cross-section diameter of 0.005 to 10 µm. If the cross-section diameter of the staple fiber is less than 0.005 µm, the mechanical strength of the composite electrolyte membrane would be remarkably decreased. On the other hand, if the cross-section diameter is more than 10 µm, it would be difficult to control the porosity of the porous substrate.

According to one illustrative embodiment of the present invention, the porous substrate is a polyimide nanoweb formed through an electrospinning process. A polyimide precursor is electrospinned to form a polyimide precursor web, and then the polyimide precursor web is imidized through drying and heating processes to obtain a final product of a polyimide nanoweb.

The polymer electrolyte membrane for a fuel cell according to the present invention further comprises a self proton conducting material dispersed in the porous substrate. The self proton conducting material comprises an inorganic particle functionalized with an azole ring.

The inorganic particle is a nanoscale particle and can be silicon oxide, metal oxide, or alkaline earth metal oxide. Specifically, the inorganic particle can be $SiO_2$, $TiO_2$, $SnO_2$, CaO, SrO, or BaO.

The azole ring can be pyrazole, imidazole, triazole, tetrazole, thiazole, or oxazole. As shown in the cation conducting mechanism of water and that of imidazole sequentially and schematically illustrated below, the azole ring can conduct a cation by itself in the same cation conducting mechanism as that of water.

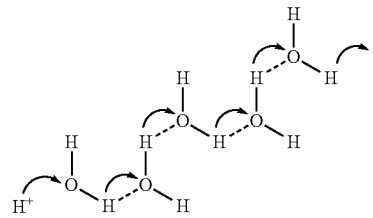

<Cation Conducting Mechanism of Water>

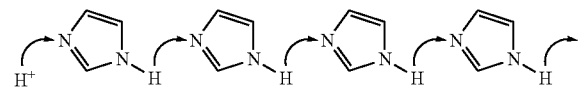

<Cation Conducting Mechanism of Imidazole>

According to the present invention, the inorganic particle functionalized with an azole ring is disposed on the surface of or inside of the fiber constituting the porous substrate, thereby enabling the porous substrate to function as a medium for the proton conduction. Thus, the electrolyte membrane of the present invention can show excellent ion conductivity even under the condition of high temperature of 100° C. or higher at which moisture is evaporated or low humidity of 50% or less.

The reaction formula I below illustrates a method for functionalize an inorganic particle with an azole ring. First, a hydrogen atom of 1H-tetrazole is substituted with an acetic acid group to form 1H-tetrazole-5-acetic acid. Subsequently, to functionalize a silica nanoparticle with the 1H-tetrazole, the 1H-tetrazole-5-acetic acid is reacted with the silica nanoparticle having hydroxyl groups resulted from the reaction with moisture in the air.

[Reaction Formula 1]

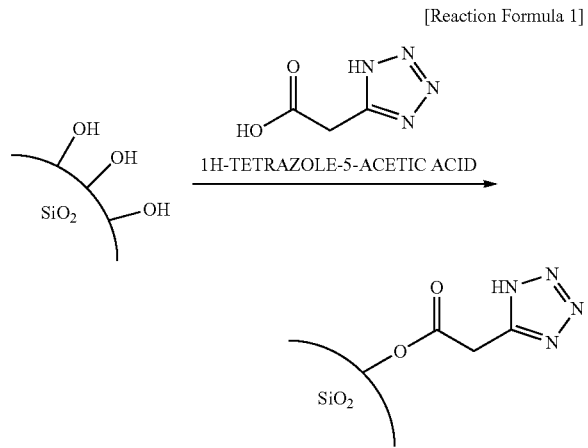

The porous substrate of the present invention is impregnated with an ion conductor.

The ion conductor performs the main function of the polymer electrolyte membrane, i.e., proton conducting function. A hydrocarbon polymer may be used the ion conductor since it has an excellent ion conductivity and is advantageous from the economic viewpoint. Particularly advantageous is a hydrocarbon polymer soluble to an organic solvent from the viewpoint of impregnation. The term "soluble" to an organic solvent means a material can be dissolved in an organic solvent at room temperature and atmospheric pressure.

Particularly, the ion conductor of the present invention may be sulfonated polysulfone, sulfonated polyaryleneethersulfone, sulfonated butadienestylene, sulfonated polyimide, sulfonated polyetheretherketone, sulfonated polybenzimidazole, sulfonated polystyrene, sulfonated polyphosphazene, or the mixture thereof. Since the ion conductor is a hydrocarbon polymer just like the porous substrate, the adhesiveness therebetween can be improved.

The polymer electrolyte membrane of the present invention may further comprise a polymer having a hydrophilic group. In addition to the self proton conductivity of the inorganic particle functionalized with an azole ring, the moisture-capturing ability of the polymer having a hydrophilic group enables the polymer electrolyte membrane to show high ion conductivity even under the condition of low humidity and high temperature.

The polymer having a hydrophilic group may be coated on the porous substrate or may constitute at least a portion of the fiber of the porous substrate.

The polymer having a hydrophilic group may be polyurethane, polyvinyl alcohol, polyethylene oxide, polypropylene oxide, polymethylene oxide, polyethylene oxide methacrylate, polyethylene oxide acrylate, polyethylene oxide dimethacrylate, polyethylene oxide diacrylate, polyhydroxyethylmethylacrylate, or copolymer thereof.

The polymer having a hydrophilic group can easily absorb and capture the moisture, and thus can prevent the ion conductivity of the ion conductor from decreasing rapidly under the condition of low humidity.

Hereinafter, the method of the present invention for manufacturing a polymer electrolyte membrane will be described and explained in detail.

The method of the present invention comprises preparing a porous substrate in which a self proton conducting material is dispersed and impregnating an ion conductor in the porous substrate. As explained above, the self proton conducting material comprises an inorganic particle functionalized with an azole ring.

According to the first embodiment of the present invention, the step of preparing the porous substrate comprises forming a nanoweb and coating a dispersed solution having the self proton conducting material dispersed therein on the nanoweb.

The step of forming the nanoweb may comprise preparing a spinning dope and electrospinning the spinning dope.

When the nanoweb is formed of a hydrocarbon polymer insoluble in an organic solvent, the spinning dope can be prepared by melting the hydrocarbon polymer. Optionally, a precursor nanoweb can be formed by dissolving a precursor in an organic solvent to obtain a spinning dope and then electrospinning the spinning dope. For example, a polyamic acid which is a polyimide precursor is dissolved in an organic solvent such as N-methyl-2-pyrrolidinone (NMP), dimethylformamide (DMF), dimethyl acetamide (DMAc), and so on to obtain a spinning dope. Then, the spinning dope is electrospinned to form a polyimide precursor nanoweb. Finally, the polyimide precursor nanoweb is imidized to complete a polyimide nanoweb. The imidization process can be performed through thermal imidization or chemical imidization. For example, the polyimide precursor nanoweb can be heat-processed by means of a hot press set up with high temperature and high pressure to form a polyimide nanoweb insoluble in an organic solvent.

During the electrospinning process, high voltage of 1 to 1,000 kV is applied to a spray jet nozzle at room temperature to 100° C. to eject the spinning dope thereby forming filaments. These filaments are collected on a collector to form a nanoweb.

The dispersed solution can be prepared by dispersing the self proton conducting material in a dispersion medium. While water or alcohol can be used as the dispersion medium, there is no specific limitation on the kind of the dispersion medium as far as the self proton conducting material can be dispersed therein. The dispersed solution so prepared is coated on the nanoweb and then dried to complete a porous substrate having an inorganic particle functionalized with an azole ring on the surface of the fiber constituting the nanoweb.

Optionally, a polymer having a hydrophilic group can be dissolved in the dispersion medium (e.g., water or alcohol) before or after the self proton conducting material is dispersed therein. The dispersed solution so prepared is coated on the nanoweb and then dried to complete a porous substrate which has an inorganic particle functionalized with an azole ring on the surface of the fiber constituting the nanoweb and the polymer having a hydrophilic group coated on the nanoweb.

The porous substrate is impregnated with an ion conductor to finally obtain a polymer electrolyte membrane. As the ion conductor is impregnated in the porous substrate, the pores of the porous substrate is filled with the ion conductor. Any method generally known in this field such as dipping, spraying, screen printing, doctor blade, and so on can be used for the impregnation process.

For example, when a dipping method is used for the impregnation process, the porous substrate is dipped in the ion conductor solution 2 to 5 times for 5 to 30 minutes and then dried at 60 to 150° C. for 2 to 5 hours to remove the organic solvent.

According to the second embodiment of the present invention, a self proton conducting material-added spinning dope is electrospinned to prepare a porous substrate in which the self proton conducting material is dispersed. The porous substrate so prepared comprises a fiber forming a three-dimensional network, and the self proton conducting material (i.e., the inorganic particle functionalized with an azole ring) is inside the fiber.

The self proton conducting material-added spinning dope can be prepared by melting a hydrocarbon polymer and then adding the self proton conducting material to the melted hydrocarbon polymer. Optionally, the hydrocarbon is melted together with a polymer having a hydrophilic group, and then the self proton conducting material is added thereto. The spinning dope so prepared is electrospinned to form a porous substrate. The porous substrate so completed comprises a fiber forming a three-dimensional network, the inorganic particle functionalized with an azole ring is inside the fiber, and at least a portion of the fiber comprises the polymer having a hydrophilic group.

If the polymer having a hydrophilic group is coated on the porous substrate, it might disadvantageously close the pores of the substrate thereby making the subsequent process of impregnating the ion conductor into the substrate difficult, if not impossible. Thus, it might be desirable for the spinning dope containing the polymer having a hydrophilic group to be electrospinned so that at least a portion of the fiber of the porous substrate forming a three-dimensional network comprises the polymer having a hydrophilic group.

When a polyamic acid solution is used as the spinning dope to form a polyimide porous substrate, the self proton conducting material added to the polyamic acid solution and then an electrospinning process is performed. Optionally, in addition to the self proton conducting material, the polymer having a hydrophilic group can be added to the polyamic acid solution. The spinning dope so prepared is electrospinned to form a polyimide precursor nanoweb, and then an imidization process is performed in such a manner as explained above.

Hereinafter, the present invention will be described in more detail with reference to Examples and Comparative Examples.

Manufacturing of Self Proton Conducting Material 1 g of 1H-tetrazole-5-acetic acid (>99.9%) (Aldrich Chemical) was dissolved in 50 mL of ethanol for 1 hour. 1 g of silica nanoparticles (Cabot Corporation) was introduced to 50 mL of ethanol, and dispersed in a ultrasonic processor at room temperature for 1 hour. Then, the tetrazole acetic acid solution was introduced to the solution having the silica nanoparticles dispersed therein, and the mixture was stirred at room temperature for 3 hours. Subsequently, the mixture was dried in a vacuum oven at 60° C. for 24 hours to remove the solvent, and the self proton conducting material in which the weight ratio of the silica nanoparticles to the tetrazole acetic acid was 1:1 was finally obtained.

EXAMPLE 1

15 wt. % of polyamic acid was dissolved in the spinning solvent of tetrahydrofuran (THF) to obtain a spinning dope. The spinning dope was electrospinned with 30 kV voltage applied at 25° C. to form a polyimide precursor nanoweb. The polyimide precursor nanoweb was heat-processed in the oven at 350° C. for 5 hours to obtain a polyimide nanoweb.

Subsequently, 1 g of the self proton conducting material was dispersed in 10 g of ethanol to prepare a dispersed solution. 10 g of the dispersed solution was applied to the polyimide nanoweb, and then the polyimide nanoweb was dried at 60° C. for 24 hours to complete a porous substrate. Sulfonated polysulfone was dissolved in N-methyl-2-pyrrolidone (NMP) to obtain 10 wt. % of ion conductor solution. The porous substrate was dipped into the ion conductor solution 3 times for 20 minutes at room temperature. During the dipping process, reduced pressure was applied for 1 hour to remove fine bubbles. And then, the porous substrate was dried in the hot air oven maintained at 120° C. for 3 hours to remove NMP thereby completing a polymer electrolyte membrane.

EXAMPLE 2

A polymer electrolyte membrane was made in the same manner as that of the Example 1 except that a dispersed solution was prepared by dissolving 1 g of 15 wt. % polyvinyl alcohol in 10 g of water and dispersing the self proton conducting material therein and 10 g of the dispersed solution so prepared was applied to the polyimide nanoweb.

EXAMPLE 3

A spinning dope was prepared by dissolving 15 wt. % of polyamic acid in the spinning solvent of tetrahydrofuran (THF) and adding 10 g of the self proton conducting material thereto. The spinning dope was electrospinned with 30 kV voltage applied at 25° C. to form a polyimide precursor nanoweb. The polyimide precursor nanoweb was heat-processed in the oven at 350° C. for 5 hours to obtain a polyimide nanoweb.

Subsequently, sulfonated polysulfone was dissolved in N-methyl-2-pyrrolidone (NMP) to obtain 10 wt. % of ion conductor solution. The polyimide nanoweb was dipped into the ion conductor solution 3 times for 20 minutes at room temperature. During the dipping process, reduced pressure was applied for 1 hour to remove fine bubbles. And then, the polyimide nanoweb was dried in the hot air oven maintained at 120° C. for 3 hours to remove NMP thereby completing a polymer electrolyte membrane.

EXAMPLE 4

A polymer electrolyte membrane was made in the same manner as that of the Example 3 except that a spinning dope was made by dissolving 10 g of 15 wt. % polyvinyl alcohol together with 15 wt. % of polyamic acid in the spinning solvent of tetrahydrofuran (THF) and adding 10 g of the self proton conducting material thereto.

COMPARATIVE EXAMPLE 1

15 wt. % of polyamic acid was dissolved in the spinning solvent of tetrahydrofuran (THF) to obtain a spinning dope. The spinning dope was electrospinned with 30 kV voltage applied at 25° C. to form a polyimide precursor nanoweb. The polyimide precursor nanoweb was heat-processed in the oven at 350° C. for 5 hours to obtain a polyimide nanoweb.

Subsequently, sulfonated polysulfone was dissolved in N-methyl-2-pyrrolidone (NMP) to obtain 10 wt. % of ion conductor solution. The polyimide nanoweb was dipped into the ion conductor solution 3 times for 20 minutes at room temperature. During the dipping process, reduced pressure was applied for 1 hour to remove fine bubbles. And then, the polyimide nanoweb was dried in the hot air oven maintained at 120° C. for 3 hours to remove NMP thereby completing a polymer electrolyte membrane.

COMPARATIVE EXMAPLE 2

A polymer electrolyte membrane was made in the same manner as that of the Comparative Example 1 except that a spinning dope was made by dissolving 10 g of 15 wt. % polyvinyl alcohol together with 15 wt. % of polyamic acid in the spinning solvent of tetrahydrofuran (THF).

The proton conductivities of the polymer electrolyte membranes produced in Examples 1 to 4 and Comparative Examples 1 and 2 were respectively measured in accordance with the following method, and the results of the measurements are shown Table 1 below.

Measurement of Proton Conductivity at Various Relative Humidity

The conductivity of the electrolyte membranes of Examples and Comparative Examples were measured according to the constant current four-point probe method. In detail, a sample of the electrolyte membrane having a rectangular shape of 1×3 cm$^2$ was immersed in the distilled water and stabilized for 20 to 30 minutes while immersed (i.e., under the condition of 100% relative humidity). And then, the proton conductivity at 100% relative humidity was obtained by measuring the AC potential difference occurring at the center of the electrolyte membrane sample while constant alternating current was applied to the both ends thereof. Subsequently, the proton conductivity at the relative humidity of 80%, 60%, 40%, and 20% were respectively measured in the same manner as above. As a device for measuring the proton conductivity is used a through-plane membrane test system (Scribner Associates Inc., MTS 740) which can measure the through-plane conductivity of the sample. The results of the measurements are shown Table 1 below.

Unlike the method for measuring the in-plane conductivity, the measurement direction of the method for measuring the through-plane conductivity is same as that of the method for measuring the fuel cell performance. Thus, the measurement of the through-plane conductivity can make it possible to predict the fuel cell performance without actual production of the fuel cell. Especially, when a supporting body such as a reinforced membrane is inserted between the ion conductors, although the internal resistance cannot be known through the measurement of the in-plane conductivity, the measurement of the through-plane conductivity can advantageously make it possible to predict the effect of the supporting body on the fuel cell performance as well as on the ion conductivity.

TABLE 1

|   | Proton conductivity at 100% relative humidity (S/cm) | Proton conductivity at 80% relative humidity (S/cm) | Proton conductivity at 60% relative humidity (S/cm) | Proton conductivity at 40% relative humidity (S/cm) | Proton conductivity at 20% relative humidity (S/cm) |
|---|---|---|---|---|---|
| Ex. 1 | 0.09 | 0.08 | 0.07 | 0.06 | 0.04 |
| Ex. 2 | 0.09 | 0.08 | 0.07 | 0.06 | 0.04 |
| Ex. 3 | 0.08 | 0.07 | 0.06 | 0.05 | 0.02 |
| Ex. 4 | 0.08 | 0.07 | 0.06 | 0.05 | 0.02 |
| Comp. Ex. 1 | 0.08 | 0.07 | 0.06 | 0.04 | 0.009 |
| Comp. Ex. 2 | 0.07 | 0.06 | 0.05 | 0.03 | 0.007 |

The invention claimed is:

1. A polymer electrolyte membrane comprising:
a porous substrate;
an ion conductor impregnated in the porous substrate; and
inorganic particles dispersed in the porous substrate,
wherein the organic particles are formed of SiO$_2$, TiO$_2$, SnO$_2$, CaO, SrO, or BaO and functionalized with an azole ring compound.

2. The polymer electrolyte membrane of claim 1, wherein the azole ring compound is pyrazole, imidazole, triazole, tetrazole, thiazole, or oxazole.

3. The polymer electrolyte membrane of claim 1, wherein the porous substrate is formed of a first hydrocarbon polymer, and the ion conductor is a second hydrocarbon polymer having a sulfonic acid group.

4. The polymer electrolyte membrane of claim 3, wherein the porous substrate is a polyimide web comprising a fiber having a cross-section diameter of 0.005 to 10 μm.

5. The polymer electrolyte membrane of claim 1, wherein the porous substrate comprises a fiber forming a three-dimensional network, and the inorganic particles are on a surface of the fiber.

6. The polymer electrolyte membrane of claim 1, wherein the porous substrate comprises a fiber forming a three-dimensional network, and the inorganic particles are inside the fiber.

7. The polymer electrolyte membrane of claim 1, further comprising a polymer having a hydrophilic group, the polymer being coated on the porous substrate.

8. The polymer electrolyte membrane of claim 7, wherein the polymer having the hydrophilic group is polyurethane, polyvinyl alcohol, polyethylene oxide, polypropylene oxide, polymethylene oxide, polyethylene oxide methacrylate, polyethylene oxide acrylate, polyethylene oxide dimethacrylate, polyethylene oxide diacrylate, polyhydroxyethylmethylacrylate, or copolymer thereof.

9. The polymer electrolyte membrane of claim 1, wherein the porous substrate comprises a fiber forming a three-dimensional network, and at least a portion of the fiber comprises a polymer having a hydrophilic group.

10. The polymer electrolyte membrane of claim 9, wherein the polymer having the hydrophilic group is polyurethane, polyvinyl alcohol, polyethylene oxide, polypropylene oxide, polymethylene oxide, polyethylene oxide methacrylate, polyethylene oxide acrylate, polyethylene oxide dimethacrylate, polyethylene oxide diacrylate, polyhydroxyethylmethylacrylate, or copolymer thereof.

* * * * *